United States Patent
Fujikura et al.

[11] Patent Number: 5,478,619
[45] Date of Patent: Dec. 26, 1995

[54] WEB TAKEUP ROLL

[75] Inventors: Daisuke Fujikura; Takashi Nawano, both of Kanagawa, Japan

[73] Assignee: Fuji Photo Film Co., Ltd., Kanagawa, Japan

[21] Appl. No.: 743,070

[22] Filed: Aug. 9, 1991

[30] Foreign Application Priority Data

Aug. 9, 1990 [JP] Japan ................................. 2-209083

[51] Int. Cl.⁶ .................................................. B29D 23/00
[52] U.S. Cl. .......................... 428/36.91; 428/913; 492/59; 29/447
[58] Field of Search ................ 428/36.91, 34.9, 428/913; 242/68.5, 67.1 R; 492/59; 29/447

[56] References Cited

U.S. PATENT DOCUMENTS

| | | | |
|---|---|---|---|
| 3,475,245 | 10/1969 | Bearer | 428/36.91 |
| 4,695,008 | 9/1987 | Dabrowski | 262/68.5 |
| 4,832,276 | 5/1989 | Gerhardt et al. | 242/78.1 |
| 4,934,622 | 6/1990 | Hakiel | 242/68.5 |
| 4,945,127 | 7/1990 | Kagawa et al. | 524/524 |
| 5,049,591 | 9/1991 | Hayashi et al. | 521/159 |
| 5,057,252 | 10/1991 | Kagawa et al. | 264/22 |
| 5,093,384 | 3/1992 | Hayashi et al. | 521/159 |
| 5,098,776 | 3/1992 | Kobayashi et al. | 428/283 |
| 5,128,197 | 7/1992 | Kobayashi et al. | 428/225 |
| 5,135,786 | 8/1992 | Hayashi et al. | 428/35.5 |
| 5,139,832 | 8/1992 | Hayashi et al. | 428/35.5 |
| 5,145,935 | 9/1992 | Hayashi | 528/65 |

FOREIGN PATENT DOCUMENTS

| | | |
|---|---|---|
| 57-169314 | 10/1982 | Japan . |
| 58-85210 | 5/1983 | Japan . |
| 59-11315 | 1/1984 | Japan . |
| 59-227438 | 12/1984 | Japan . |
| 60-36538 | 2/1985 | Japan . |
| 61-264057 | 11/1986 | Japan . |
| 63-11470 | 1/1988 | Japan . |
| 63-41382 | 2/1988 | Japan . |
| 63-41072 | 3/1988 | Japan . |

OTHER PUBLICATIONS

Hayashi, "Technology of the Next–Generation Actuator", Mitsubishi Heavy Industries, Ltd., used in Seminar held by the Japan Society of Mechanical Engineers in Jan. 1990.

*Primary Examiner*—James J. Seidleck
*Assistant Examiner*—Michael A. Williamson
*Attorney, Agent, or Firm*—Sughrue, Mion, Zinn, Macpeak & Seas

[57] ABSTRACT

A web takeup roll includes a web takeup core and a shape-memory resin layer provided on an outer circumference of the web takeup core. In the present web takeup roll, a modulus of elasticity of the shape-memory resin layer changes with temperature.

3 Claims, 1 Drawing Sheet

WEB TAKEUP ROLL

BACKGROUND OF THE INVENTION

This invention relates to an improvement of the roll that is to be loaded in a takeup unit for coating or otherwise treating the surface of an elongated web of support (hereunder referred to simply as "a web") such as paper, a plastic film or a thin metal sheet.

Products obtained by coating or otherwise treating the surface of webs are extensively used in industry. Since many of those products are made from expensive materials as typically exemplified by photo-graphic materials, it is desired to produce them with the highest possible yield.

One of the causes that have lowered the yield of those products is transfer, or a phenomenon in which the shape of the foremost or leading end of a web wound onto a takeup roll is transferred under the web takeup pressure onto overlying turns of the web having a coating or a layer of surface treatment. Stated more specifically, a product of interest is wound onto the web takeup roll by first joining its leading end to the roll with adhesive tape, by application of static electricity or by some other means and by then winding successive turns of the web over the leading end of the web which takes on various shapes such as a slanting line, a circular arc, sawteeth and a triangle. As a result, a step, or a difference in level, that corresponds to the web thickness will occur between the surface of the roll and the shape of the leading end of the web and as successive turns of the web are taken up by the roll, a shape that is similar to that of the leading end of the web will develop in the stepped area in an amount that is proportional to the web takeup pressure. The coating or the layer of surface treatment on the surface of the web in that area undergoes plastic deformation and, if the product is a photographic material, this will cause pressure fog, uneven thickness and other defects that contribute to a lower yield of the final products. The extent of the occurrence of such defective products due to transfer is variable with the constituent material of the web, the diameter of the takeup roll, its constituent material and the condition of the takeup operation but, typically, such defective products occur as soon as the takeup operation starts and continues until several to several tens of turns of the web are wound up.

Under the circumstances, it was previously attempted to eliminate the adverse effects of "transfer" by increasing the diameter of the takeup roll or taking up the web with the takeup tension being reduced for the first several turns of the web. However, the increase in the diameter of the takeup roll results in an increase in its weight, causing inconvenience in transport and storage aspects. Lower takeup tensions can cause substantial misalignment in overlapping turns of the web and the range of conditions that can be adopted is also limited. Another current practice is to use adhesive tape that is as thin as possible but the effectiveness of this approach which is solely directed to the reduction in thickness is limited.

With a view to alleviating the adverse effects of the steps, an attempt has been made to wrap a soft material such as polyurethane rubber around the surface of the take up roll. This method has proved to be effective in the initial period but has no long-term utility on account of deterioration with time. With prolonged use, the elastic property of the rubber decreases and the inherent cushioning effect cannot be achieved. In addition, the rubber sheds off as particles that can potentially be incorporated into the final product.

Several methods have been proposed to solve those problems: in one method, the circumference of a takeup roll is covered with a soft elastomer that is formed of a leather-like sheet having a surface hardness of 55–90 degrees (see Unexamined Published Japanese Patent Application No. 41382/1988); in another method, the circumference of a takeup roll is covered with a rubber layer having a hardness of 20–60 degrees (see Unexamined Published Japanese Utility Model Application No. 11470/1988); in still another method, the surface of a takeup roll is provided with a stepped cutout that corresponds to the shape of the leading end of the sheet which is to be wound onto the roll (see Unexamined Published Japanese Utility Model Application No. 41072/1988).

As described above, the use of a soft surfacing material and the provision of steps on takeup rolls have been the two recent approaches taken to alleviate the transfer of steps that occurs in the first several turns of the web or sheet is attached. However, the first approach which uses rubber or some other suitable soft material on the surface of a takeup roll suffers disadvantages associated with rubber deterioration, its recovery and compatibility with film securing tape. The second approach involves so much difficulty in achieving registry between the cut end of a film and the stepped area of the takeup roll that no proper adjustments can be made if the film thickness varies.

SUMMARY OF THE INVENTION

The present invention has been accomplished under these circumstances and has as an object providing a web or film takeup roll that is adjustable to various film thicknesses, that experiences minimum materials deterioration, that features effective recovery, and that has good compatibility with film securing tape.

This object of the present invention can be attained by a web takeup roll having a web takeup core and a shape-memory resin layer formed on an outer circumference of the web takeup core.

DETAILED DESCRIPTION OF THE INVENTION

The web takeup roll of the present invention may itself be made of various materials including a metal, a resin, etc.

Details of the shape-memory resin to be used in the present invention are given in the textbook entitled "Technology of the Next-Generation Actuator" which was written by S. Hayashi of Mitusbishi Heavy Industries, Ltd. and which was used at the seminar held by The Japan Society of Mechanical Engineers in January 1990. The shape-memory resin is defined in that textbook as "a resin which, if deformed at one temperature, will completely recover its original shape on being raised to a higher temperature and which will exhibit this phenomenon in an observable state over a useful temperature range." There are four resins that are currently available on the market as common shape-memory resins and they are transpolyisoprene, polynorbornene, a styrene-butadiene copolymer and polyurethane.

All of these resins have been verified to develop the shape-memory effect.

Figure 2:
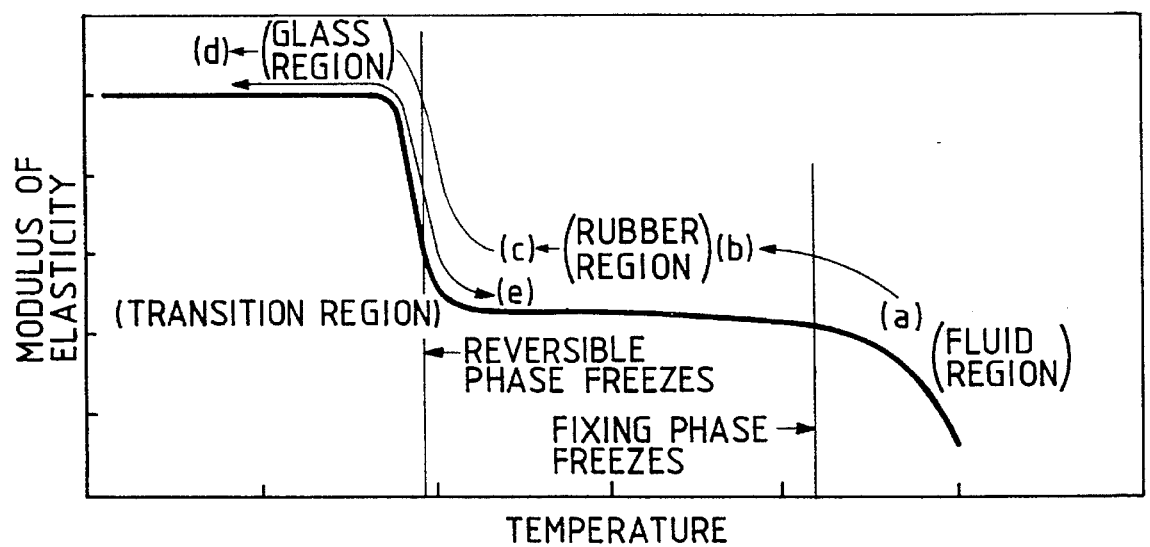
FIG. 2 is a graph showing the profile of temperature-dependent phase change that occur in the shape-memory resin used in the present invention.

FIG. 2 is a graph showing how the modulus of elasticity of the shape-memory resin changes with temperature. In order to insure that two different regions, a rubber region and a fluid region, are developed distinctly, each of the currently available commercial shape-memory resins is composed of two phase. One is a fixing phases that helps the resin retain a certain shape and the other is a reversible phase that reversibly undergoes softening and hardening to develop the shape-memory effect.

Consisting of those two phases, the shape-memory resin can cause the following phenomena, in the order written, in response to temperature changes:

(1) molding:
(a) the resin is held above a certain temperature to become softened (thermally melted into a fluid region);
(b) the resin is cooled to a certain shape A (the original shape is given in a rubber region);

(2) setting:
(c) an external force is applied to deform the resin from shape A to another shape B (the resin remains in the rubber region);
(d) with shape B retained, the resin is further cooled; in this state, shape B is retained even if the external force is removed (the resin is in a glass region);

(3) shape recovery:
(e) the resin reverts to shape A upon heating to the temperature at which only the reversible phase will soften (the resin is in the rubber region).

The shape-memory resin is capable of repeating steps (c)–(e) and hence develops the shape-memory effect through many cycles.

The temperatures associated with the fixing and reversible phases differ from one resin to another but it is essential for the development of the shape-memory effect that the modulus of elasticity makes a substantial and abrupt change with temperature in the reversible phase (see Unexamined Published Japanese Patent Application Nos. 169314/1982, 85210/1983, 11315/1984, 227438/1984, 36538/1985 and 264057/1986).

Figure 1:
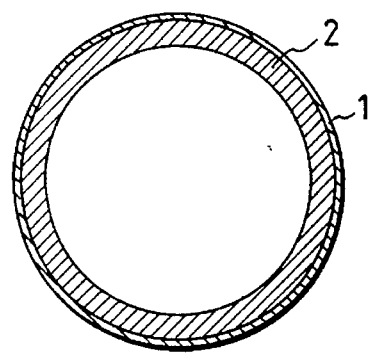
FIG. 1 is a cross section of a web takeup roll according to an embodiment of the present invention.

An embodiment of the present invention is described below with reference to FIG. 1. As shown, a shape-memory resin layer 1 is applied to the surface of a roll 2 and heated above the temperature where the fixing phase of the resin freezes. the resin layer is then cooled to freeze the fixing phase. Just prior to the winding up of a web, the surface of the roll is heated above the rubber transition temperature of the resin (i.e., above the reversible phase freezing point but below the fixing phase freezing point) and the web is subsequently taken up by the roll. At the heating temperature, the surface of the roll is elastic like rubber so that the leading end of the web attached to the roll puts a stress on the rubber surface to cause deformation (B). When the roll cools during or after the winding up of the web, the surface of the roll makes a transition to the glass phase and the shape B of the leading end of the web is left as indentation on the roll surface. For using the same roll in order to wind up another web, it need only be heated again, whereupon it reverts to the original cylindrical shape (A).

There is no particular limitation on the method of forming a layer of shape-memory resin on the surface of a takeup roll. In one method, a film of shape-memory resin is first prepared by either coating or molding and then attached to the surface of a roll. Alternatively, a layer of shape-memory resin is directly coated onto the surface of a cylindrical roll.

The web to be used in the present invention may be selected from a broad range of materials including paper, plastic films, resin coated paper, an aluminum web, and synthetic paper. Plastic films may be made of various materials including polyolefins such as polyethylene and polystyrene, vinyl polymers including polyvinyl acetate, polyvinyl chloride and polystyrene, polyamides such as nylon 6,6 and nylon 6, polyesters such as polyethylene terephthalate and polyethylene-2,6-naphthalate, polycarbonates, and cellulose acetate such as cellulose triacetate and cellulose diacetate. Resins for use in resin coated paper are typified by, but not limited to, polyolefins such as polyethylene.

The following example is provided for the purpose of further illustrating the present invention but is in no way to be taken as limiting.

A cylindrical aluminum roll (i.d., 270 mm; o.d., 290 mm; wall thickness t, 10 mm; length, 1600 mm) was coated on the outer surface with a shape-memory polyurethane resin layer 1 in an annular form that had an inside diameter (i.d.) of 290 mm, an outside diameter (o.d.) of 300 mm and a wall thickness of 5 mm. Before takeup operation, the roll was heated to a temperature of 30°–100° C. (preferably 30°–50° C.) to remove any residual transfer of steps that had occurred in the previous windup operations. After thus leveling off the roll surface, a web consisting of a photographic material coated on a 100-μm thick polyethylene terephthalate film was wound onto the roll. During the takeup operation, the roll was cooled to a temperature of 5°–25° C., preferably 15°–25° C. The leading end of the wound film bit into the surface of the shape-memory resin to produce indentation, so that the shape of that leading end of the film was not at all transferred onto the surface of the overlaying photographic material. After unwinding the film, the roll could be repeatedly used for taking up other webs by heating to a temperature of 30°–100° C.

The web takeup roll of the present invention can be repeatedly used to wind up varying thicknesses of webs without deterioration. The surface of the roll achieves good recovery to the original shape and also has good compatibility with film securing tape. Webs and other film products can be wound up by this roll without causing any transfer of the leading end of the web or cut end of the film securing tape. Because of these features, the takeup roll of the present invention makes great contribution to improvements in the quality and yield of the final coated products.

What is claimed is:

1. A web takeup roll around which a web is adapted to be wound comprising:

web takeup core; and a shape-memory resin layer, provided around said core, for allowing a leading end of said web initially contacting said memory means to form an indentation therein in which said leading end is received so that successive rotations of said web are not deformed by said end, said resin layer having the property of transitioning between a rubber region in which said indentation is formed and a glass region in which said indentation becomes fixed in response to a change in temperature.

2. A web takeup roll according to claim 1, wherein a modulus of elasticity of said shape-memory resin layer changes with temperature.

3. A method of winding a web on a takeup roll, comprising the steps of:

applying a shape-memory resin layer to a surface of the roll;

heating the surface of the roll above a rubber transition temperature of the resin but below a fixing phase freezing point such that said resin assumes a natural shape thereof;

winding the web around the roll such that a portion of said resin is deformed to receive an end of said web; and cooling the surface of the roll below the rubber transition temperature of the resin during or after the winding of the web around said roll such that said resin retains said deformed shape.

* * * * *